United States Patent [19]

Sibeud et al.

[11] 4,140,031

[45] Feb. 20, 1979

[54] DEVICE FOR CHANGING THE GEARS AUTOMATICALLY ON A SYNCHRONIZED GEARBOX

[75] Inventors: Jean-Paul Sibeud, Chaponnay (Rhone); Jean-Mari Noyer, Ste. Foy les Lyon (Rhone), both of France

[73] Assignee: Automobiles M. Berliet, Lyons, France

[21] Appl. No.: 563,377

[22] Filed: Mar. 31, 1975

[30] Foreign Application Priority Data

Mar. 29, 1974 [FR] France .................. 74 11917

[51] Int. Cl.² ........................ B60K 41/18; F16H 5/60
[52] U.S. Cl. ........................ 74/866; 74/336 R
[58] Field of Search ............ 74/336, 337, 866

[56] References Cited

U.S. PATENT DOCUMENTS

| 3,439,564 | 4/1969 | Scholl et al. ............ 74/336 X |
| 3,545,307 | 12/1970 | Bildat ..................... 74/336 X |
| 3,732,755 | 5/1973 | Beig et al. .............. 74/336 X |
| 3,741,042 | 6/1973 | Ravenel .................. 74/866 X |
| 3,759,344 | 9/1973 | Blee et al. .............. 74/866 X |
| 3,885,472 | 5/1975 | Wakamatsu et al. ... 74/866 |

FOREIGN PATENT DOCUMENTS

2240672 7/1975 France.
2233893 10/1975 France.
2265568 10/1975 France.

*Primary Examiner*—Samuel Scott
*Assistant Examiner*—Lance W. Chandler
*Attorney, Agent, or Firm*—Irving M. Weiner; Pamela S. Austin; Melvin Yedlin

[57] ABSTRACT

A processing device capable of starting the sequence of the speed change operations automatically in the gearbox of a vehicle, such as the automatic transmission of a truck. A first comparator (302) compares the data received from a gearbox condition detecting device (500) and that received from a speed ratio selection device (200). In the event of a difference, the comparator (302) sends to a gearbox control device (400) either a pulse for increasing by one speed ratio, or a pulse for decreasing by one speed ratio.

6 Claims, 5 Drawing Figures

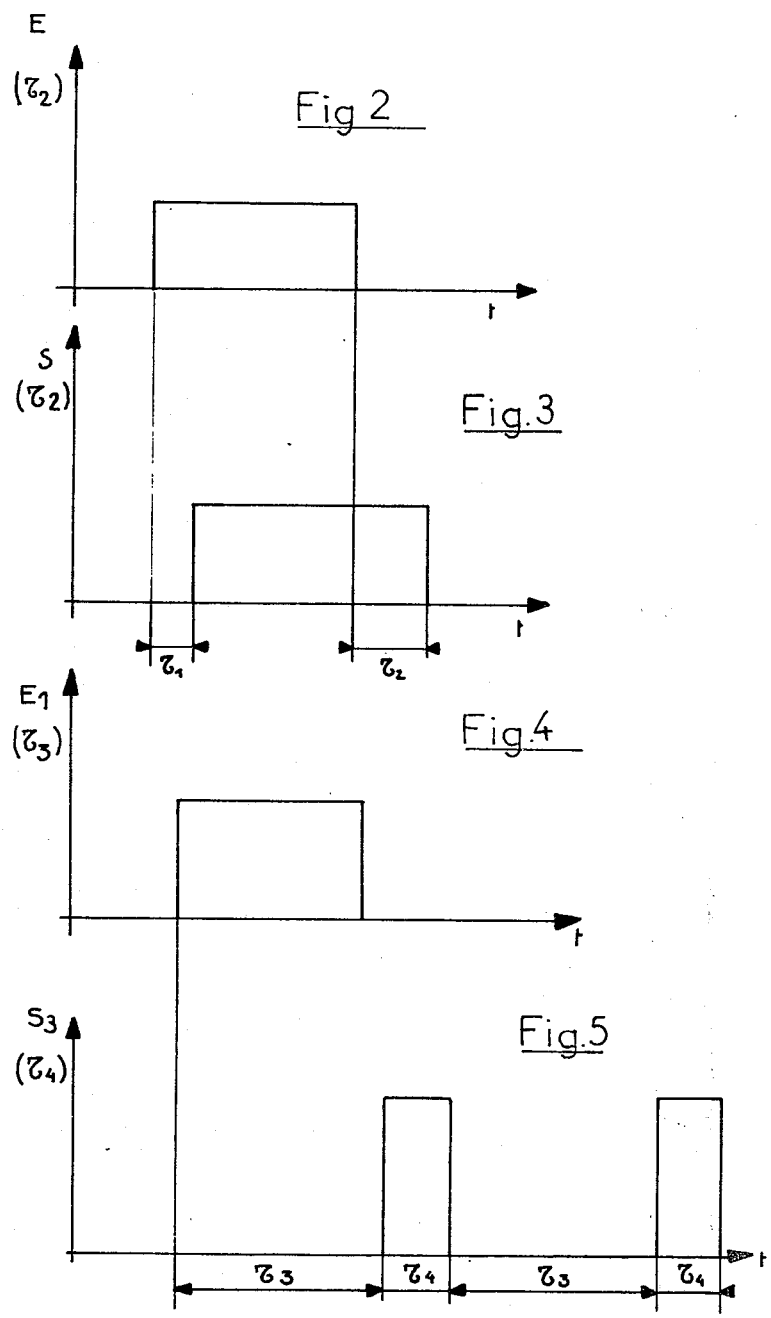

DEVICE FOR CHANGING THE GEARS AUTOMATICALLY ON A SYNCHRONIZED GEARBOX

The present invention relates to a processing device intended for the automatic control of the course of the changing of gears in a synchromesh gearbox. The device can also be used on a gearbox with individual synchromesh devices, as well as on a gearbox with a collective synchromesh device.

The invention relates more particularly to gearboxes of motor vehicles, and especially to gearboxes of trucks, lorries and heavy trucks and lorries.

BACKGROUND OF THE INVENTION

The control of gearboxes of known types used on trucks and lorries is carried out by the driver, according to a complex process, the automatic character of which is obtained by training the driver (declutching, passing to neutral, gearing, coupling, and on occasion, double declutching operation or double action on the accelerator pedal).

The processing device according to the present invention ensures the course of the gear-changing operations automatically, while taking into account all possible cases, as a very good truck or lorry driver would do, without ever committing any mistake.

SUMMARY OF THE INVENTION

The present invention provides a processing device for automatically controlling changes of speed in a synchronized gearbox associated with a clutch on a vehicle. The processing device is used in combination with a gearbox having change members, and a gearbox control device which is operatively connected with and controls the change members of the gearbox. The processing device also includes a device (200) for selection of speed ratios, a device (500) for detecting the condition of the gearbox, and a first comparator (302). The processing device also includes an electronic assembly having logic elements. The electronic assemby has an input section which includes the first comparator (302) operably and electrically connected between the speed ratio selection device (200) and the gearbox condition detecting device (500). The electronic assembly has its output operably and electrically connected to the gearbox control device (400) for controlling the change members of the gearbox.

The main features of the novel processing device are as follows:

(1) The operation of the device is sequential, with a check of the execution of a step required for the start of the next step. This enables safe operations of optimum rapidity.

(2) The device is checked by itself through systems which detect the mistaken codes, and it adjusts itself by itself to a change in the condition of the vehicle, either during the ratio changing operation, or after a parasitic perturbance.

(3) From the very start of the ratio change cycle, the device supplies data about the nature of said change (progression or retrogression). This is necessary for the ratio selection device in every case, and, in particular, in the case where a collective synchromesh device is used. In this way, the monitoring of the suitable synchronizing members can be started from the very start of the change of ratio, which allows saving time in substantial way with respect to the total duration of the speed ratio change.

(4) The device ensures the monitoring of the clutch during the ratio changes.

(5) The device detects the impossibilities of engagement of a ratio owing to the position "tooth against tooth" of the male and female parts of a dog. It causes the clutch to be closed by pulse so as to allow the gearing to take place (this can take place when the vehicle is at a standstill, with the engine throttled down, that is, with the clutch released).

(6) The device can be blocked during its cycle by an outer order given, for instance, by a synchronism detector, in order that the step "engaging the new ratio" starts in the cycle only after the authorization by the synchronism detector is emitted.

Various other features and objects of the present invention will appear in the following description and appended claims, reference being had to the accompanying non-limiting drawings forming a part of this specification wherein like reference characters designate corresponding items in the several views.

BRIEF DESCRIPTION OF THE DRAWINGS

FIGS. 2 through 5 depict the shapes of certain signals at various locations in the circuitry depicted in FIG. 1.

DETAILED DESCRIPTION

Figure 1:
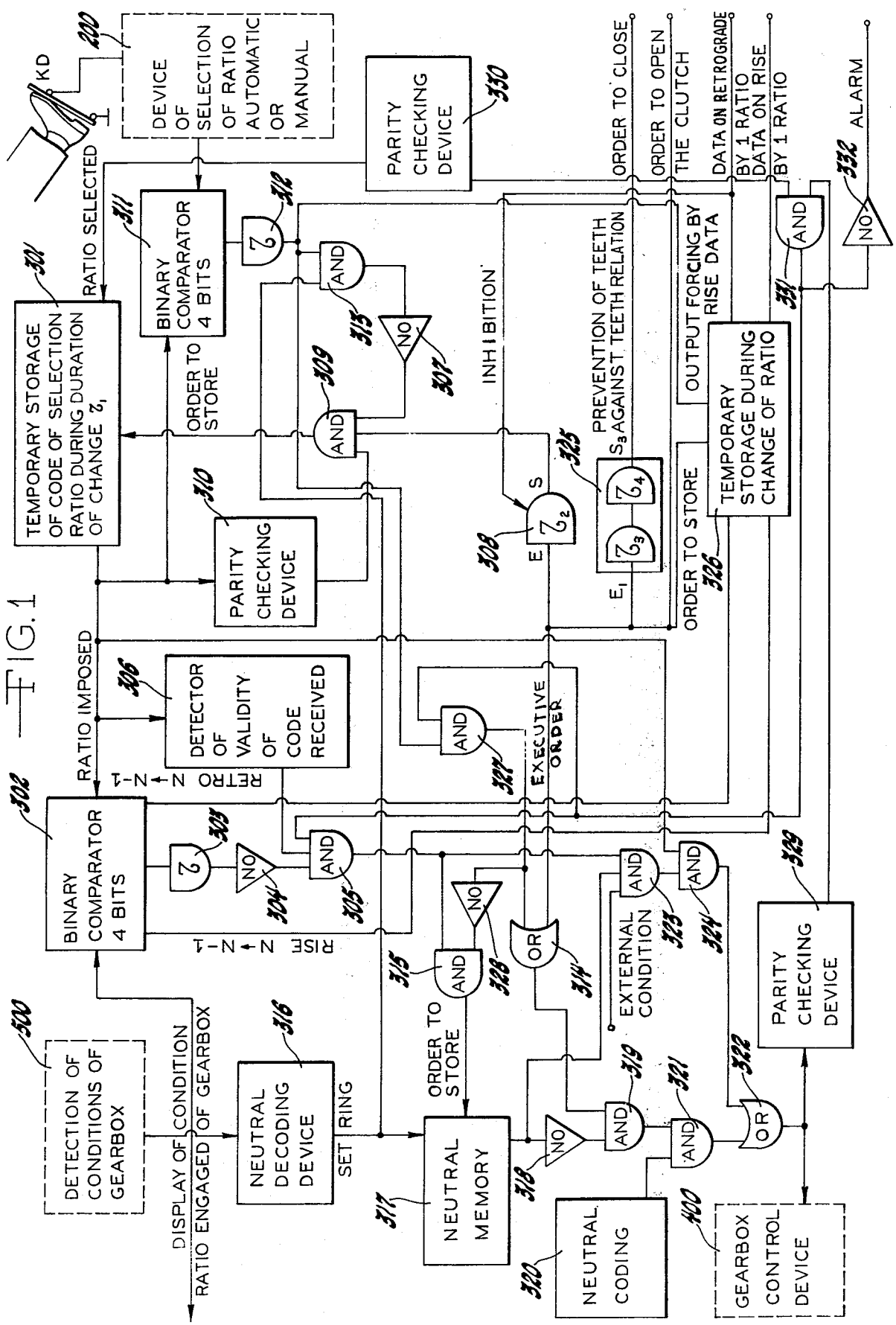
FIG. 1 illustrates the general structure of a preferred embodiment of the processing device according to the present invention which may be used in conjunction with the gearbox of a truck.

Before explaining the present invention in detail, it is to be understood that the invention is not limited in its application to the details of construction and arrangement of parts illustrated in the accompanying drawings, because the invention is capable of other embodiments and of being practiced or carried out in various ways. Also, it is to be understood that the phraseology or terminology employed herein is for the purpose of description and not of limitation.

The processing device illustrated by FIG. 1 includes essentially logic elements, such as AND gates, OR gates, delay units, and the like. The arrangement constitutes an electronic assembly connected to the cover of a gearbox, and, namely, to a gearbox control device 400 which drives the gearbox (gear control forks or jacks).

The structure of this processing device will be indicated in the course of the following description of its operation:

A ratio code, selected by a device 200 for selection of the ratio, is presented to the input of a temporary storage memory 301, which transmits ratio code to a first input of a first comparator 302 (a binary comparator, for instance, a four-bit comparator).

A code of the gearbox condition, worked out or elaborated by a device 500, is presented to the second input of the comparator 302.

The comparator 302 detects:

either a sameness, in which case no modification of the condition of the gearbox is necessary, or a difference, in which case a change of ratio is necessary, with the following alternative:

if the code of the ratio selected is higher than the code of condition, a 37 progression" will be selected (the speeds will be "raised");

if the code of the ratio selected is lower than the code of condition, a "regression" will be selected (one speed will be retrograded).

The first comparator 302 emits the data of change of ratio, and a further data characterizing the nature of said change. From the very start of the cycle, the data "Progression" or "Regression" will be stored by a temporary storage means 326, and is available for the external uses specified.

The development of a change of ratio of the gearbox is as follows:

When the first comparator 302 finds that the two signals received are not identical any longer, it stops emitting a (1) on the input of delay unit 303, which is a delay circuit intended to avoid taking fleeting mistaken detections into account. NOT gate 304 allows obtaining a (1) when the sameness ceases. AND gate 305 emits an order to execute the change of ratio if the unbalance of the comparator 302 and the validity of the codes are confirmed by the devices 306, 329, 330, 331 and 332. In order that a cut wire or a disconnected connection prohibits any dangerous operation, the validity detector 306 detects the "0 0 0 0" code, which is never used, and would correspond to a disconnected connection, while parity checking device 330, AND gate 331, NOT gate 332 and parity checking device 329 are devices checking the evenness or parity of the binary code used.

The executive order emitted by the AND gate 305 brings about the following events:

order to store, for the temporary storage means or memory 326 of the nature of the change of ratio;

order to "open" the clutch;

order to bring the gearbox into "Neutral", through OR gate 312, third AND gate 319, "Neutral" coding device 320, AND gate 321, OR gate 322, and control device 400. This order is inhibited via a "Neutral" decoding device 316 if the gearbox is already in "Neutral";

order to store, for the memory 301 of the ratio selected if the following conditions are complied with:

(a) checking the parity of the code of the ratio selected by parity checking device 310, this parity should be correct;

(b) the order to execute must be present;

(c) the NOT gate 307 and second AND gate 313 imply or impose the obigation not to have the "Neutral" and the output code of the memory 301 smaller than the input code of the memory 301 simultaneously. Such a situation is possible only if the memory 301 is already in a storing condition. The input code of the memory 301 is still the code selected, but the output code of the memory 301 is then called the "imposed code" for the duration of the ratio change cycle.

During a change of ratio the speed of the vehicle may increase or decrease. If the ratio selected becomes greater than the ratio imposed, there is a risk of overspeed for the engine. Such an occurrence is prevented by a second comparator 311 which, through delay unit 312 and AND gate 313, inhibits the order to store sent by an AND gate 309 to the memory 301. The contents of the memory 301 is brought up-to-date on the new ratio selected. At the same time, an order to pass to "Neutral" is sent by the devices 327, 314, 319, 321, 322 and 400, while, through NOT gate 328 and AND gate 315, a "Neutral" memory 317 of passage to Neutral is deleted. The object of this arrangement is to impose passing to "Neutral" in all cases.

In the event of the ratio imposed being modified by the action of second comparator 311, etc., it is known that it is necessarily a progression, so that the temporary storage means or memory 326 of the nature of the change of condition must be suitably positioned by an order to force.

Lastly, as regards the ratio changes which consist in progressions, it is desirable to hold the "imposed ratio" for some time after the clutch is "closed", in order that the speed of the vehicle again reaches a correct value. This is obtained by means of a second delay unit or system 308, which allows the executive order given to AND gate 309 to disappear only after a time $\tau_2$ if the operation is a progression. A delay system 325 is provided in order that, after a period of time $\tau_3$ greater than a normal change of ratio, after the beginning of the execution of the order, there is an emission of a closing pulse for the clutch during a period of time 96 4 sufficient for unlocking the dogs which are in tooth-to-tooth contact, and this without shaking the vehicle.

The above events precede the engagement of the new ratio.

Engagement of the Imposed Ratio

The code of the imposed ratio, delivered by the memory 301 via devices 324, 322 and 400, is engaged, if the following requirements are combined together at the inputs of AND gate 323:

external condition = 1
"Neutral" memory = 1
executive order = 1

After the ratio imposed is engaged, the system or device 500 presents to the first comparator 302 a code of condition identical with the imposed code, and the executive signal disappears, as well as:

the order to open the clutch
the orders to store for the following memories:
  memory 301 of ratio (with delay in the event of a progression)
  memory 326 of nature of the change
  memory 317 of "Neutral".

The system is now ready to receive a new selected ratio.

Description of the Passage to "Neutral"

The passage to "Neutral"0 is obtained in the following way, if the gearbox has a ratio engaged:

Decoding device 316 for "Neutral" indicates (0) on the "Neutral" memory 317.

The advent of an executive order brings about:

(a) the order to store in memory 317 through AND gate 315, if AND gate 327 via NOT gate 328 does not find any fault;

(b) the order to pass to neutral through devices 314, 319, 320, 321, 322 and 400 because the "Neutral" decoding device 316 emits a (0) transmitted by "Neutral" memory 317 and inverted by NOT gate 318, which makes it possible to pass through AND gate 319.

As soon as the neutral is obtained, the device 500 will emit its "neutral" code, which will be acknowledged by decoding device 316, the latter emitting then (1) towards memory 317 which stores this data and transmits it to NOT gate 318, the latter inverting it and locking AND gate 319. For the same reason AND gate 321 becomes locked and control device 400 no longer receives (via OR gate 322) the "Neutral" code generated by 320.

On the other hand, the (1) at the output of memory 317 unlocks AND gate 323 which allows conveying the code imposed towards control device 400 via OR gate 322.

The "Neutral" memory 317 allows keeping AND gate 323 unlocked during the passage from "neutral" to the ratio imposed. This memory will be deleted at the end of the cycle.

It has been seen that in case of the device being brought up-to-date on a new ratio in the course of the operation, the "Neutral" memory 317 was deleted by the devices 311, 312, 327 and 328, while the "Neutral" was controlled by the devices 311, 312, 327, 314, 319, 320, 321, 322 and 400.

The position "Neutral" must be considered as the position which must necessarily be reached in any manipulation in order to avoid serious mishaps, even when the gearbox is equipped with mechanical safety means.

FIGS. 2 to 5 illustrate the shapes of the signals at various locations of the circuit, namely:

the signal E at the input of the delay system $\tau_6$ (FIG. 2);

the signal S at the output of the delay system $\tau_2$ (FIG. 3);

the signal $E_1$ at the input of the delay system $\tau_3$ (FIG. 4);

the signal $S_3$ at the output of the delay system $\tau_4$ (FIG. 5).

There is herein incorporated by reference the following disclosures: commonly-assigned copending United States Patent Application, Ser. No. 479,537 filed on June 14, 1974, naming Jean-Paul Sibeud as inventor, and entitled "DEVICE WITH A JACK FOR CONTROLLING A GEARBOX SYNCHROMESH, AND METHOD FOR USING SAME"; commonly-assigned U.S. Pat. No. 3,943,792 issued Mar. 16, 1976 naming Jean-Paul Sibeud as inventor, and entitled "METHOD AND DEVICE FOR ASCERTAINING THE STATE OF A GEARBOX, IN PARTICULAR IN A MOTOR VEHICLE"; commonly-assigned copending United States Patent Application, Ser. No. 469,232 filed on May 13, 1974 naming Jean-Paul Sibeud as inventor and entitled "AUTOMATIC CLUTCH DEVICE FOR MOTOR VEHICLES" (now abandoned); and commonly-assigned copending U.S. patent application, Ser. No. 561,247 filed Mar. 24, 1975 naming Jean-Paul Sibeud as inventor and entitled "DEVICE FOR THE AUTOMATIC OR MANUAL SELECTION OF THE RATIO OF A GEARBOX ON A MOTOR VEHICLE" and claiming Convention priority from French Patent Application No. 7,411,844 filed Mar. 26, 1974 (French Publication No. 2,265,568). The disclosures of all of the aforementioned applications are hereby incorporated herein by reference thereto. Also incorporated herein by reference thereto are French Pat. Nos. 2,233,893; 2,265,568; and 2,240,672.

We claim:

1. A processing device for automatically controlling changes of speed in a synchronized gearbox associated with a clutch of a vehicle, comprising, in combination:
    a gearbox having change members;
    a gearbox control device (400) operatively connected with and controlling said change members of said gearbox;
    a device (200) for selection of speed ratios;
    a device (500) for detecting the condition of said gearbox;
    a first comparator (302);
    an electronic assembly including logic elements;
    said electronic assembly having an input section which includes said first comparator (302) operably and electrically connected between said speed ratio selection device (200) and said gearbox condition detecting device (500);
    said electronic assembly having its output operably and electrically connected to said gearbox control device (400) for controlling said change members of said gearbox;
    said input section of said electronic assembly also including a memory device (301) for the temporary storage of the code of a selected ratio; and
    said memory device (301) being operably and electrically connected between said speed ratio selection device (200) and said first comparator (302).

2. A processing device for automatically controlling changes of speed in a synchronized gearbox associated with a clutch of a vehicle, comprising, in combination:
    a gearbox having change members;
    a gearbox control device (400) operatively connected with and controlling said change members of said gearbox;
    a device (200) for selection of speed ratios;
    a device (500) for detecting the condition of a gearbox;
    a first comparator (302);
    an electronic assembly including logic elements;
    said electronic assembly having an input section which includes said first comparator (302) operably and electrically connected between said speed ratio selection device (200) and said gearbox condition detecting device (500);
    said electronic assembly having its output operably and electrically connected to said gearbox control device (400) for controlling said change members of said gearbox; and
    said first comparator (302) comprising a four-bit binary comprator.

3. A processing device according to claim 1, wherein:
    said speed ratio selection device (200) selects a ratio code and transmits said selected ratio code to the input of said temporary storage memory (301);
    said gearbox condition detection device (500) produces a gearbox condition code and transmits said gearbox condition code to said first comparator (302);
    and, when said first comparator (302) detects a difference between said ratio code and said gearbox condition code, said first comparator (302) emits:
        a "progression" pulse for increasing by one speed if the selected ratio code is greater than said gearbox condition code; and
        a "regression" pulse for decreasing by one speed if the selected ratio code is less than said gearbox condition code.

4. A processing device according to claim 3, wherein:
    said electronic assembly also includes a validity detector (306) operably and electrically connected to said temporary storage memory (301);
    said temporary storage memory (301) transmits an input code to said validity detector (306);
    said detector (306) detects the validity of the input code received from the temporary storage memory (301);
    said electronic assembly also includes a first AND gate (305), a "Neutral" memory (317), and a temporary storage means (326);

the output of said validity detector (306) and the output of said first comparator (302) are both connected as inputs to said first AND gate (305); and the output of said first AND gate (305) is electrically connected to and shared between said "Neutral" memory (317), said temporary storage means (326), and said gearbox control device (400).

5. A processing device according to claim 3, wherein:

said processing device is used in combination with a gearbox having a collective synchromesh device which is common to all of the ratios of the gearbox; and said "progression" or "regression" pulse data of a ratio being utilized to control the action of the collective synchromesh device.

6. A processing device according to claim 5, including:

an external authorization system which permits the blocking of the process of change of ratio until the collective synchromesh device, which has been suitably and previously controlled by the "progression" or "regression" data, brings about the synchronism.

* * * * *